No. 802,458. PATENTED OCT. 24, 1905.
T. LEE.
FIRE RESISTING SHEET METAL WINDOW FRAME.
APPLICATION FILED MAR. 25, 1905.
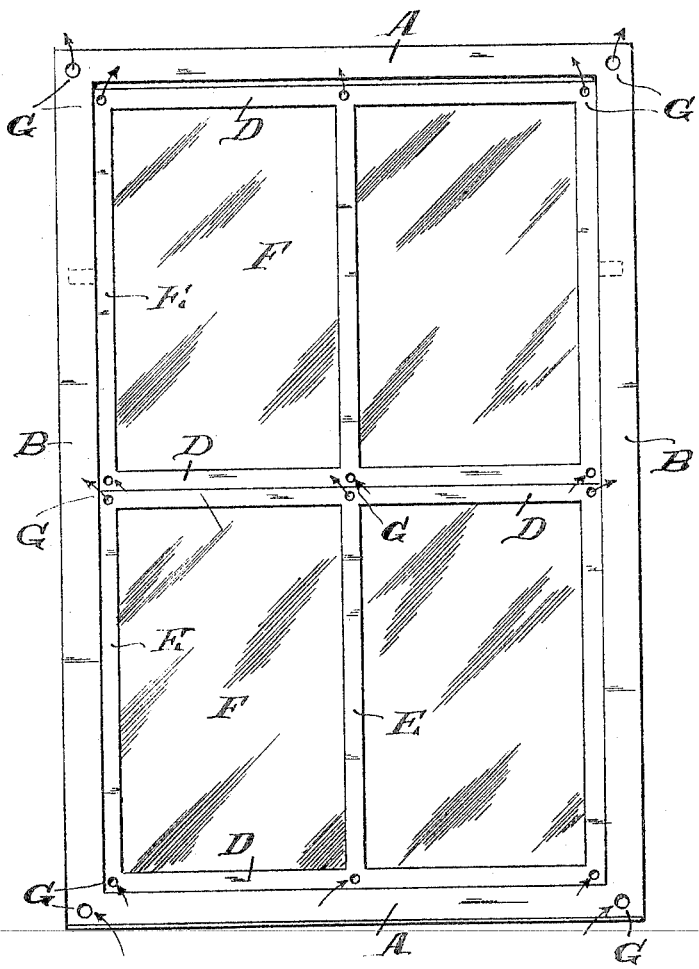
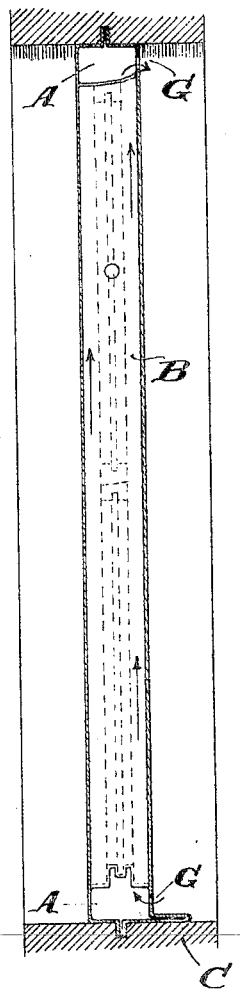
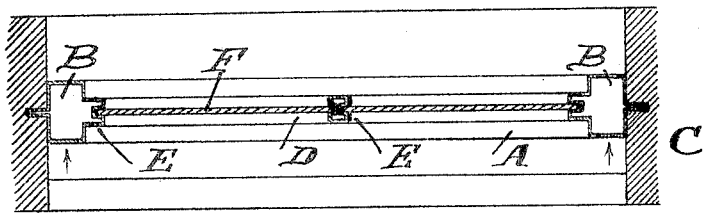
Witnesses
C. Meyer
C. Klinger
Inventor
Thomas Lee
by C. Spengel atty.

UNITED STATES PATENT OFFICE.

THOMAS LEE, OF HOME CITY, OHIO.

FIRE-RESISTING SHEET-METAL WINDOW-FRAME.

No. 802,458.          Specification of Letters Patent.          Patented Oct. 24, 1905.

Application filed March 25, 1905. Serial No. 251,939.

*To all whom it may concern:*

Be it known that I, THOMAS LEE, a citizen of the United States, residing at Home City, Hamilton county, State of Ohio, have invented certain new and useful Improvements in Fire-Resisting Sheet-Metal Window-Frames; and I do declare the following to be a clear, full, and exact description thereof, attention being called to the accompanying drawings, with the reference characters marked thereon, which form also a part of this specification.

This invention relates to improvements in structural elements used in the construction of buildings where such elements are hollow and made of sheet metal in order to resist or retard fire—like, for instance, frames, jambs, stiles, casings, &c., used in connection with fire-retarding or fire-resisting closures for windows, sashes, or doors, &c. The joints and seams of these parts are usually formed by riveting or folding, lapping, and interlocking the edges to be connected in a manner customary in sheet-metal working. The resulting seams and joints are quite close and tight, and when power-formed or power-pressed seams are used the resulting connections are nearly air-tight or at least so tight in most cases as to prevent or resist free movement of air. The movement of air I have here in view is such as may be due to the rapid expansion of air confined inside of these hollow structures when their outside is exposed to the heat of a fire. The tightly-closed joints of these structures failing to provide a sufficient vent for this increased volume of air and the structures being otherwise incapable of accommodating such increase the usual result is a sudden and forcible distention or rending of the frames. As a consequence the parts also leave or change their proper shape and position with reference to other adjacent parts—as, for instance, to retaining-walls. They also when used in connection with closures, like windows or doors, release panels, glass-panes, &c., held by them, producing thereby gaps and openings which permit the fire to spread, although the condition of these parts and their ability to resist a fire would otherwise be unimpaired. I overcome these objections by providing outlet-openings in the sheet-metal sides which inclose these hollow structures, and which openings are of a size to permit a free escape of air should the volume thereof increase suddenly by expansion due to the heat from a fire and whereby immediate relief is afforded before these parts are subjected to any destructive strains. In addition to this, and especially in the case of vertically-disposed parts of these structures, I arrange these openings in a manner so that they not only afford the immediate relief for the purpose stated, but so that they also add an element of continued protection during a fire by starting a movement or circulation of air through these parts and whereby cooler air is constantly drawn in and caused to pass through, thus serving to cool from the inside the hot and exposed parts of the metal, thereby increasing the fire-resisting capacity of these structures and preventing their early destruction.

In order to make myself better understood, I have shown my invention as applied to a window constructed of the usual fire-resisting type and consisting of a sheet-metal casing and of sheet-metal sashes, which latter are filled with panes of the usual wire-glass. Casings and sash-frames are supposed to be hollow, as best shown in the accompanying drawings, in which—

Figure 1 is an elevation of such a window and may be taken as it appears when viewed from the inside of the building. Fig. 2 is a vertical section through the casing thereof, and Fig. 3 is a horizontal cross-section.

The window may be of the kind having permanently closed—that is, immovable—sashes, one or two, or they may be supported to be movable to permit opening. Where two are used, the upper one is usually so supported to be movable for opening, which support may be by pivots, as indicated, which feature, however, has no bearing upon my invention.

In the drawings, A A are the hollow horizontal and B B the hollow upright members of the window frame or casing, retained by being set within a wall C, which surrounds such frame. D D are the hollow horizontal and E E the hollow upright parts of the sash-frames, which are filled with panels F of suitable material, which may be glass or the usual wire-glass. The members of this frame and of the sashes are supposed to be hollow and made of sheet metal for the purpose stated, the joints and seams being constructed and closed in the usual manner customary in metal-working. The lower sash may be a permanent one—that is to say, it may form a part of the window frame or casing. The upper sash may be movable to permit opening and is pivotally supported for such purpose, as indicated. It will now be seen when the outside of these structures becomes hot, and especially if the impact of the heat is a sudden one, that the air confined within will quickly expand and force an outlet. The effects of this latter action manifest themselves in many various ways. The parts are rent and torn, seams are opened, the metal is caused to bend or to buckle, &c. The results are that one, some, or all of the parts leave their proper position with relation to each other. The panels may be forced out of the sash-frames which retain them. The sashes may leave their position within the casings, or these latter may leave their position within the window-opening in the wall. In either case openings would result, which permit transmission of the fire from one side of the window to the other and to prevent which is the very object of the particular construction of these windows. Thus the function of the structure, which is to retard the spread of a fire, is destroyed at the outset by action of a limited degree of heat merely, which would otherwise leave their usefulness unimpaired. To counteract these destructive influences, I provide openings G in the sides or walls of these structures on the inside only, with reference to the building, to open them so as to permit the air confined within them to pass out when it becomes expanded by heat before any destructive strains are exerted upon the metal. By arranging these openings, furthermore, at or near the ends of these hollow structures, particularly of their vertically-disposed parts, a circulation is induced through the vertical hollow parts whereby cooler air is constantly drawn in and caused to pass through, thus increasing the fire-resisting capacity of these structures and lengthening their usefulness. Being closed outwardly, communication of fire by entrance through these openings is avoided. I am aware that in fire-resisting windows with spaced double glazing means have been provided to ventilate the space between. The glazing and the hollow frames of such windows have also been used to ventilate the interior of a building by rendering the same open outwardly, so as to be in communication with the outer air through these frames and the openings therein. My invention has no such objects and does not serve to ventilate the building by opening the same to the outer air, which would also expose it to the danger of taking fire. The frames constructed according to my invention remain intact outwardly, but have air-outlets on their inner side to permit escape of the air confined within them, for the reasons explained, when the same becomes expanded by the heat from a fire.

Having described my invention, I claim as new—

Sheet-metal sash and window-frames consisting of hollow, communicating members which are intact outwardly, but have openings on their inner side to permit for the reason stated, escape of air, confined within them, when the same becomes expanded by heat.

In testimony whereof I hereunto affix my signature in the presence of two witnesses.

THOMAS LEE.

Witnesses:
C. SPENGEL,
C. MEYER.